United States Patent
Nicholls et al.

(10) Patent No.: US 12,288,912 B2
(45) Date of Patent: Apr. 29, 2025

(54) REDOX FLOW BATTERY WITH A BALANCING CELL

(71) Applicant: UOP LLC, Des Plaines, IL (US)

(72) Inventors: Natalie L. Nicholls, Chicago, IL (US); William T. Kender, Chicago, IL (US); Melissa L. Helm, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 154 days.

(21) Appl. No.: 17/644,396

(22) Filed: Dec. 15, 2021

(65) Prior Publication Data

US 2022/0209274 A1 Jun. 30, 2022

Related U.S. Application Data

(60) Provisional application No. 63/132,601, filed on Dec. 31, 2020.

(51) Int. Cl.
*H01M 8/18* (2006.01)
*H01M 8/0202* (2016.01)
*H01M 8/04791* (2016.01)

(52) U.S. Cl.
CPC ......... *H01M 8/188* (2013.01); *H01M 8/0269* (2013.01); *H01M 8/0482* (2013.01)

(58) Field of Classification Search
CPC .................................................. H01M 8/188
See application file for complete search history.

(56) References Cited

U.S. PATENT DOCUMENTS

| 10,347,925 B2 | 7/2019 | Pijpers | |
| 2011/0081561 A1* | 4/2011 | Keshavarz | H01M 8/188 |
| | | | 429/49 |
| 2011/0086247 A1* | 4/2011 | Keshavarz | H01M 8/188 |
| | | | 429/105 |
| 2015/0255824 A1* | 9/2015 | Evans | H01M 8/188 |
| | | | 429/418 |
| 2018/0175438 A1* | 6/2018 | Modderno | H01M 8/04686 |

(Continued)

FOREIGN PATENT DOCUMENTS

| CA | 3056916 A1 | 9/2018 |
| WO | 2016168362 A1 | 10/2016 |
| WO | 2017189282 A1 | 11/2017 |

OTHER PUBLICATIONS

Mann, R. F., et al. "Henry's Law and the solubilities of reactant gases in the modelling of PEM fuel cells." Journal of power sources 161.2 (2006): 768-774. (Year: 2006).*

(Continued)

*Primary Examiner* — Sadie White
*Assistant Examiner* — Kayla Elaine Clary

(57) ABSTRACT

A redox flow battery with an electrochemical balancing cell having first and second chambers. The first chamber includes a catalyst coated substrate and the second chamber includes an electrode. Each receives an electrolyte from the redox flow battery. There is a single interface between the two chambers. The balancing cell reverses parasitic reactions in the first chamber that occur in the redox flow battery. The products of the reversed reactions are carried away from the electrochemical balancing cell and back to the redox flow battery in the electrolyte that carried the reactant to the first chamber. Also, processes for reversing a parasitic reaction in a redox flow battery.

12 Claims, 5 Drawing Sheets

(56) References Cited

U.S. PATENT DOCUMENTS

| | | | |
|---|---|---|---|
| 2018/0277868 A1 | 9/2018 | Loretz et al. | |
| 2018/0294502 A1* | 10/2018 | Selverston | H01M 4/36 |
| 2019/0221870 A1 | 7/2019 | Moriuchi et al. | |
| 2020/0044267 A1 | 2/2020 | Perry | |
| 2020/0313212 A1 | 10/2020 | Loretz et al. | |

OTHER PUBLICATIONS

Hagedorn, Norman H., Nasa Redox Storage System Development Project Final Report, Oct. 1984.
International Search Report from corresponding PCT application No. PCT/US2021/073200 mailed on Apr. 14, 2022.
Written Opinion from corresponding PCT application No. PCT/US2021/073200 mailed on Apr. 14, 2022.

* cited by examiner

REDOX FLOW BATTERY WITH A BALANCING CELL

RELATED APPLICATIONS

This application claims priority to U.S. Provisional Patent Application No. 63/132,601 filed Dec. 31, 2020, the entirety of which is incorporated herein by reference.

FIELD OF THE INVENTION

This invention relates generally to redox flow batteries and more specifically, to an electrochemical balancing cell in redox flow batteries.

BACKGROUND OF THE INVENTION

Aqueous redox flow batteries (RFBs) with sufficiently high voltages, such as all-iron or all-vanadium batteries, will produce electrochemical side reactions that form a gas, for example, oxygen or hydrogen.

Generally, a redox flow battery includes an anode, a cathode, an anolyte or negative electrolyte, a catholyte or positive electrolyte, and an ion-selective membrane. The ion-selective membrane provides a semipermeable membrane between the anolyte and the catholyte. Pumps introduce and recirculate the anolyte to the anode and the catholyte to the cathode, respectively. In an all-iron RFB, the anolyte includes mostly iron (II), $Fe^{2+}$. The catholyte includes mostly iron (III), $Fe^{3+}$. During charging of the iron RFB, the reaction in the anolyte at the anode is $Fe^{2+} + 2e^- \rightarrow Fe^0$. The reaction in the catholyte at the cathode is $2Fe^{2+} \rightarrow 2Fe^{3+} + 2e^-$. During discharge, the reaction in the anolyte at the anode is $Fe^0 \rightarrow Fe^{2+} + 2e^-$ and the reaction in the catholyte at the cathode is $2Fe^{3+} + 2e^- \rightarrow 2Fe^2$. As noted above, various undesired side reactions occur in the RFBs.

More specifically, an all-iron RFB typically operates with an acidic electrolyte which produces hydrogen gas as a parasitic side reaction. This reaction removes electrons from the positive electrolyte and protons from the negative electrolyte.

This has the net effect of creating an imbalance in the state of charge of the battery. The positive electrolyte is "charged" during this side reaction, but no iron is plated from the negative electrolyte to counter the "charging."

Eventually, if there is no remedy, this imbalance in the state of charge of the battery will lead to cell failure. Thus, RFBs need a mechanism to reverse this process to balance the cell.

While presumably effective for their intended purposes, the current processes and systems for rebalancing the cells in an RFB suffer from drawbacks. In a first conventional method, an interface is created across a membrane between the positive electrolyte and the hydrogen gas. In this cell, the hydrogen is oxidized to protons (H+) and the $Fe^{3+}$ is reduced to $Fe^{2+}$. When the reaction occurs, the state of charge is balanced, however the protons (H+) migrate into the positive electrolyte. This essentially takes protons (H+) from the negative electrolyte (during hydrogen generation) and releases them into the positive electrolyte (during rebalancing).

In another method, a flow through cell is provided between a hydrogen gas chamber and the positive electrolyte chamber. This design allows for the same electrochemical state of charge balancing. Additionally, this configuration provides for the direct insertion of protons (H+) back into the negative electrolyte instead of into the positive. This, in effect, balances not only the state of charge but also the pH of the negative electrolyte. However, this design requires a second membrane, and also requires that one of the membranes is highly conductive for proton (H+) transport. These two factors increase the cost of the rebalancing cell.

Accordingly, it would be desirable to provide a rebalancing cell for an RFB which provides for the state of charge balancing and maintains the protons in the negative electrolyte without requiring multiple membranes between the half-cells of the balancing cell.

SUMMARY OF THE INVENTION

One or more rebalancing cells for an RFB have been invented which balance the state of charge of the positive electrolyte and the pH of the negative electrolyte, however, without requiring a highly proton conductive membrane or membrane electrode assembly.

In one new configuration, the first chamber of the rebalancing cell includes an upper gaseous portion above the negative electrolyte. A catalyst spans the gaseous and liquid phases to create a series of triple interfaces between the catalyst, the gas, and the electrolyte. When the oxidation reaction occurs, the protons (H+) are carried directly into the negative electrolyte without the use of an additional membrane. Buoyancy may be used to generate the gas-electrolyte interface. This removes the need for a highly proton conductive membrane between the gas and negative electrolytes saving on failure points and cost.

In another new configuration, hydrogen gas, the product of the parasitic reaction in the specified RFB, is combined with the negative electrolyte before the electrolyte is passed into the reaction chamber. A valve is used to control the flow of the hydrogen gas, while the electrolyte can be continuously flowed through the chamber. Such a configuration also provides new processes for controlling the cell in reversing the parasitic reaction.

Thus, various configurations of the present invention do not require multiple membranes for multiple interfaces. Additionally, the present invention is able to balance state of charge of the positive electrolyte and pH of the negative electrolyte—without requiring a highly proton conductive membrane or membrane electrode assembly.

Therefore, the present invention may be characterized, in at least one aspect, as providing a redox flow battery having a redox flow battery cell, and an electrochemical balancing cell. The electrochemical balancing cell includes: a first chamber with an inlet for a first electrolyte, an outlet for the first electrolyte, and a catalyst coated substrate; a second chamber comprising an inlet for a second electrolyte, an outlet for the second electrolyte, and an electrode; and, a separator forming an interface between the first chamber and the second chamber. The first chamber is configured to receive a stream of a gas from the redox flow battery cell. The first electrolyte includes a reaction product from an oxidation or reduction of the gas.

The first chamber of the electrochemical balancing cell may further include an inlet for the stream of the gas. The first chamber of the electrochemical balancing cell may further include an upper portion configured to receive the gas from the inlet for the stream of the gas and a lower portion configured to receive the first electrolyte from the inlet for the first electrolyte. The catalyst coated substrate may extend between the upper portion and the lower portion. The first chamber further may include an outlet for a gaseous effluent.

The first chamber may have a T-shape, with a lower portion and an upper portion that is wider than the lower portion.

The gas from the stream of the gas may be introduced to the first chamber of the electrochemical balancing cell with the first electrolyte via the inlet for the first electrolyte. The inlet for the first electrolyte may be located at a height in the first chamber of the electrochemical balancing cell that is lower than a height of the outlet for the first electrolyte. The catalyst coated substrate may include a catalyst supported on an electrically conductive porous substrate. The redox flow battery may further include a control valve in a line in communication with the inlet for the first electrolyte, and the control valve may be configured to adjust an amount of the gas passed to the first chamber of the electrochemical balancing cell.

In a second aspect, the present invention may be generally characterized as providing a redox flow battery having: an anode half-cell with an anode and an anolyte flowing through the anode chamber; a cathode half-cell with a cathode and a catholyte flowing through the cathode chamber, the cathode in electrical communication with the anode; and, an electrochemical balancing cell. The electrochemical balancing cell may include: a first chamber comprising an inlet for the anolyte, an outlet for the anolyte, and a catalyst coated substrate; a second chamber comprising an inlet for the catholyte, an outlet for the catholyte, and an electrode; and, a separator forming an interface between the first chamber and the second chamber. The first chamber may be configured to receive a gaseous reaction product produced at the anode, and the anolyte may include a reaction product from an oxidation reaction, at the catalyst coated substrate, of the gaseous reaction product.

The first chamber of the electrochemical balancing cell may further include an inlet for a stream of the gaseous reaction product and an outlet for a gaseous effluent. The first chamber may include an upper portion configured to receive the stream of the gaseous reaction product from the inlet for the stream of the gaseous reaction product and a lower portion configured to receive the anolyte from the inlet for the anolyte. The catalyst coated substrate may extend between the upper portion and the lower portion.

The first chamber may have a T-shape, with a lower portion and an upper portion that is wider than the lower portion.

A stream of the gaseous reaction product may be introduced to the first chamber with the anolyte via the inlet for the anolyte. The inlet for the anolyte may be located at a height in the first chamber that is lower than a height of the outlet for the anolyte. A substrate of the catalyst coated substrate may be a porous substrate. The redox flow battery may further include a control valve in a line in communication with the inlet for the anolyte. The control valve may be configured to adjust an amount of the gaseous reaction product to the first chamber.

In yet another aspect, the present invention, broadly, provides a process for reversing a parasitic reaction in a redox flow battery by: monitoring at least one condition of an electrolyte of a redox flow battery; adjusting, when the at least one condition is above or below a preset limit, a flow of a gaseous steam to an electrochemical balancing cell of the redox flow battery, the gaseous stream comprising a gaseous reaction product from the redox flow battery; and, oxidizing or reducing the gaseous reaction product in the electrochemical balancing cell. The flow of the gaseous steam may be adjusted independent of a flow of an electrolyte passed to the electrochemical balancing cell.

In a further embodiment, the present invention generally may be characterized as providing a process for reversing a parasitic reaction in a redox flow battery by: monitoring a pH of a negative electrolyte of a redox flow battery; adjusting, when the at least one condition is above or below a preset limit, the pH of the negative electrolyte by adjusting a flow of a hydrogen gas to a chamber of an electrochemical balancing cell, the chamber receiving the negative electrolyte; oxidizing the hydrogen gas in the electrochemical balancing cell; and, maintaining a constant voltage of the electrochemical balancing cell while the flow a hydrogen gas is adjusted.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, a new flow battery has been invented which includes a rebalancing cell for reversing a parasitic reaction product from the flow battery. According to the present invention, the half cells of the rebalancing cell are separated by a single interface with a separator. This reduces the number of interfaces and the number of separators that are required for the rebalancing cell. Additionally, in the present invention, the reversed reaction products are maintained in the electrolyte with the parasitic reaction product. Additionally, in at least one embodiment, the rebalancing cell provides for new processes for reversing the parasitic reaction.

With these general principles in mind, one or more embodiments of the present invention will be described with the understanding that the following description is not intended to be limiting.

Figure 1:
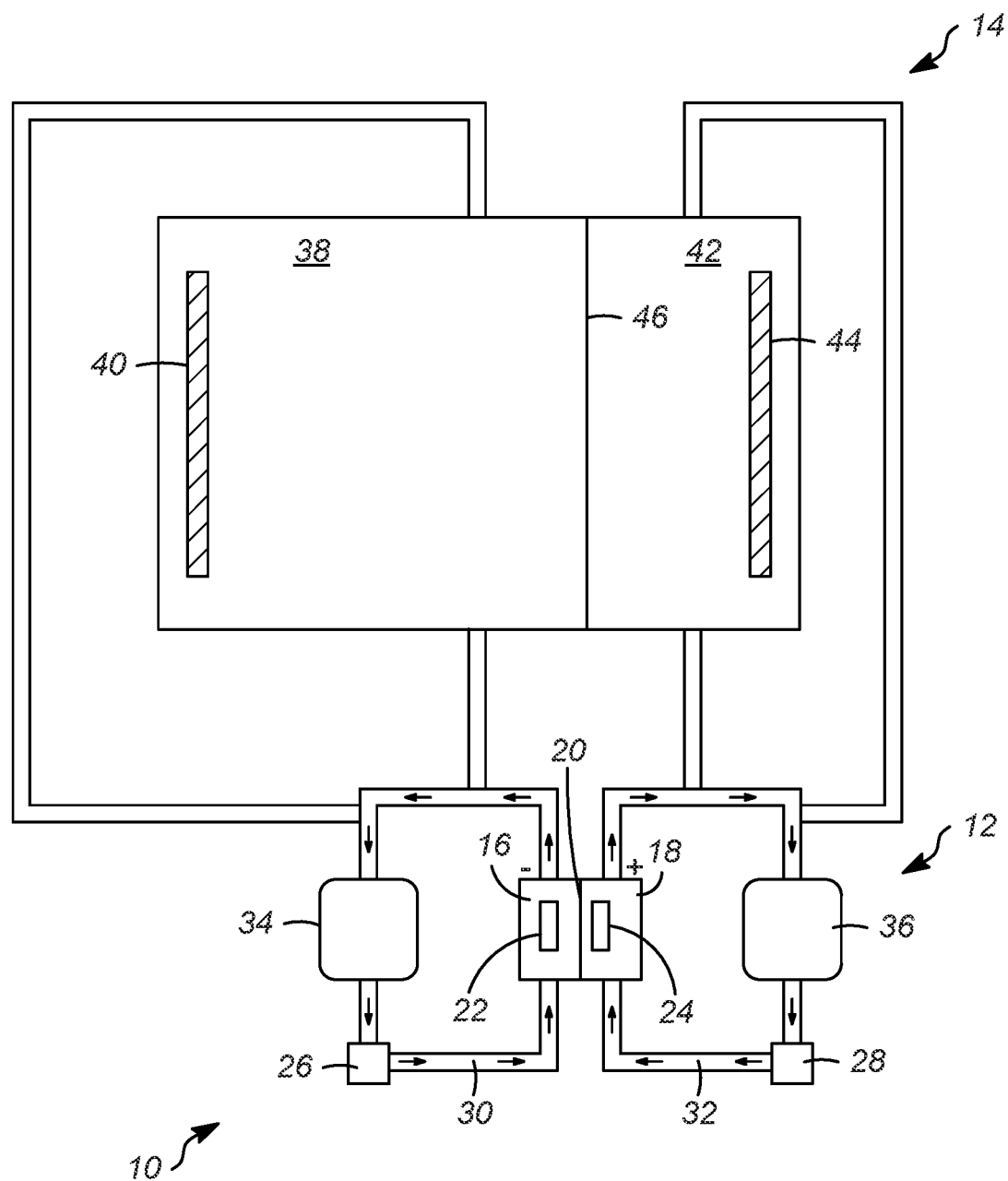
FIG. 1 is a schematic view of a redox flow battery with a balancing cell.

As shown in FIG. 1, a flow battery 10 includes a redox flow battery cell 12 and an electrochemical balancing cell 14. The redox flow battery cell 12 includes two oppositely charged half cells 16, 18 with a separator 20 between the two half cells 16, 18 of the electrochemical cell. The separator can be comprised of an ionic conducting material such as a microporous or ion-exchange membrane.

Each half cell 16, 18 includes an electrode 22, 24 that is formed from a suitably conductive material, such as a metal, carbon, graphite, and the like, and the materials for two can be the same or different. Pumps 26, 28 circulate an electrolyte 30, 32 from tanks 34, 36, to one of the half cells 16, 18.

In the depicted redox flow battery cell 12, a first electrode 22 is an anode and a first electrolyte 30 is an anolyte.

Accordingly, the second electrode 24 is the cathode and the second electrolyte 32 is a catholyte. This is merely exemplary and is not intended to be limiting.

More specifically, the following description may be focused, in parts, on oxidizing hydrogen gas to distribute protons (H+) into the negative electrolyte. However, the principals of the present invention could be implemented in a variety of different flow battery configurations. For example, the gas may be hydrogen, oxygen, chlorine. Additionally, the products of the gas reaction may be deposited into the positive electrolyte. Thus, this description is not intended to be limiting.

In a known manner, the electrodes 22, 24 are in electrical communication through a closed circuit which causes reactions at the electrodes 22, 24. As discussed above, over the course of time, hydrogen gas is generated at the anode 22 and circulates within the anolyte 30. In addition to lowering the state of charge of the anolyte 30 (compared with the catholyte 32), the production of the hydrogen gas results in an increase pH of the anolyte 30. Further, flows of ions though the separator 20 offsets the charge balance between the anolyte 30 and the catholyte 32. To counteract the production of the hydrogen, the pH change and the state of change imbalance, the anolyte 30 and the catholyte 32 are passed to the electrochemical balancing cell 14.

Generally, the electrochemical balancing cell 14 includes a first chamber 38 which receives one of the electrolytes 30, 32 and which includes a catalyst coated substrate 40. The electrochemical balancing cell 14 also includes a second chamber 42 which receives the other of the electrolytes 30, 32 and which includes an electrode 44. A separator 46 forms an interface between the first and second chambers 38, 42. Based on a voltage applied, hydrogen in the anolyte 30 can be oxidized at the catalyst coated substrate 40. As discussed above, the present invention provides configurations for the electrochemical balancing cell 14.

Figure 2:
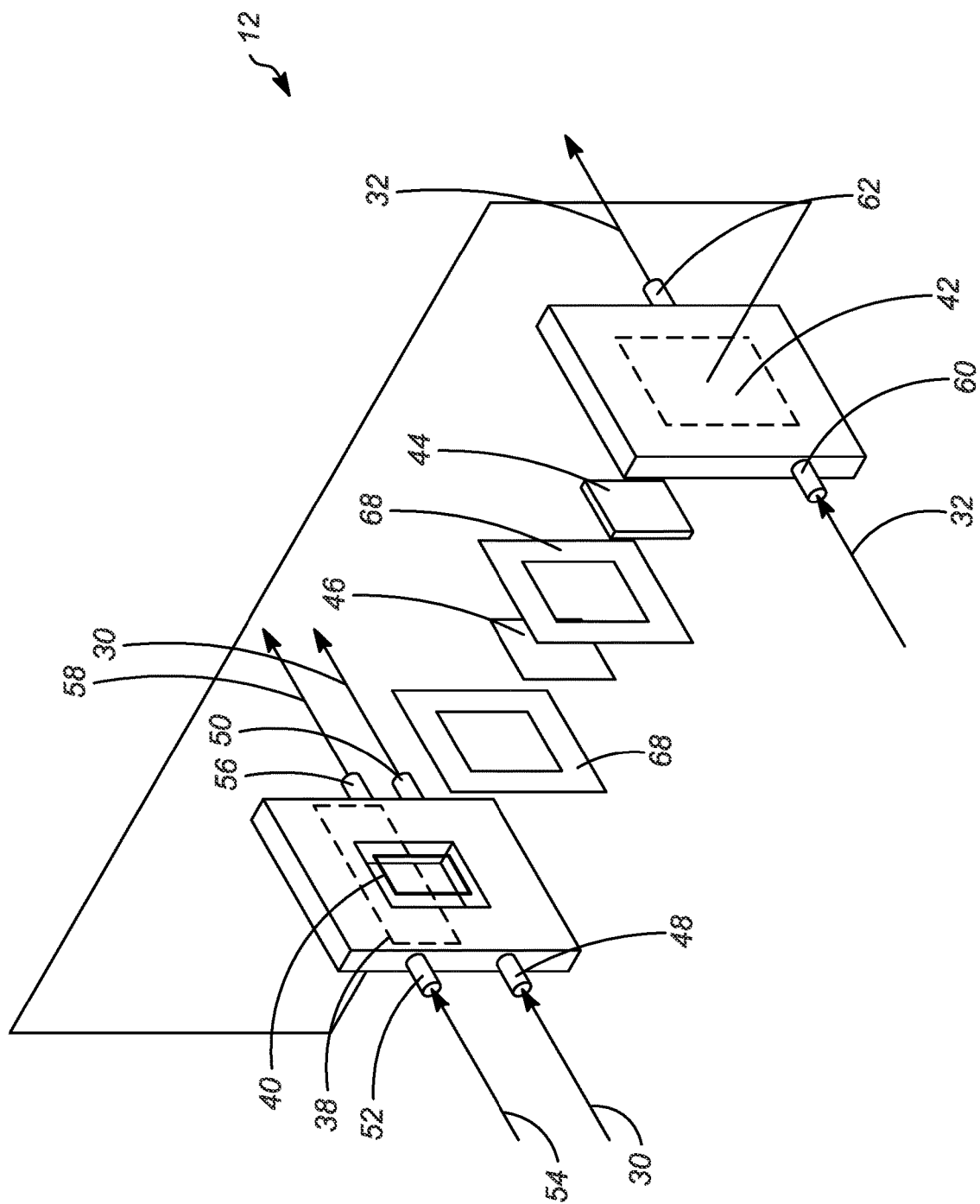
FIG. 2 is a schematic, exploded view of an embodiment of the balancing cell according to the present invention.

Accordingly, turning to FIG. 2, an embodiment of the electrochemical balancing cell 14 according to the present invention is shown in more detail. The first chamber 38 of the electrochemical balancing cell 14 includes an inlet 48 for the first electrolyte 30 and an outlet 50 for the first electrolyte 30. The first chamber 38 may also include an inlet 52 for a stream of gas 54 and an outlet 56 for a gaseous effluent 58. The stream of gas 54 may be passed from the head space of the first tank 34, with the gaseous effluent 58 being passed back to same. The stream of gas 54 may also be passed to the head space of the second tank 36 to form a pressure equalizing headspace connection. As will be appreciated, the head spaces of the two tanks 36, 34 are preferably in communication to avoid a gas build up on in one of the head spaces. The second chamber 42 includes an inlet 60 for the second electrolyte 32 and an outlet 62 for the second electrolyte 32.

Figure 3:
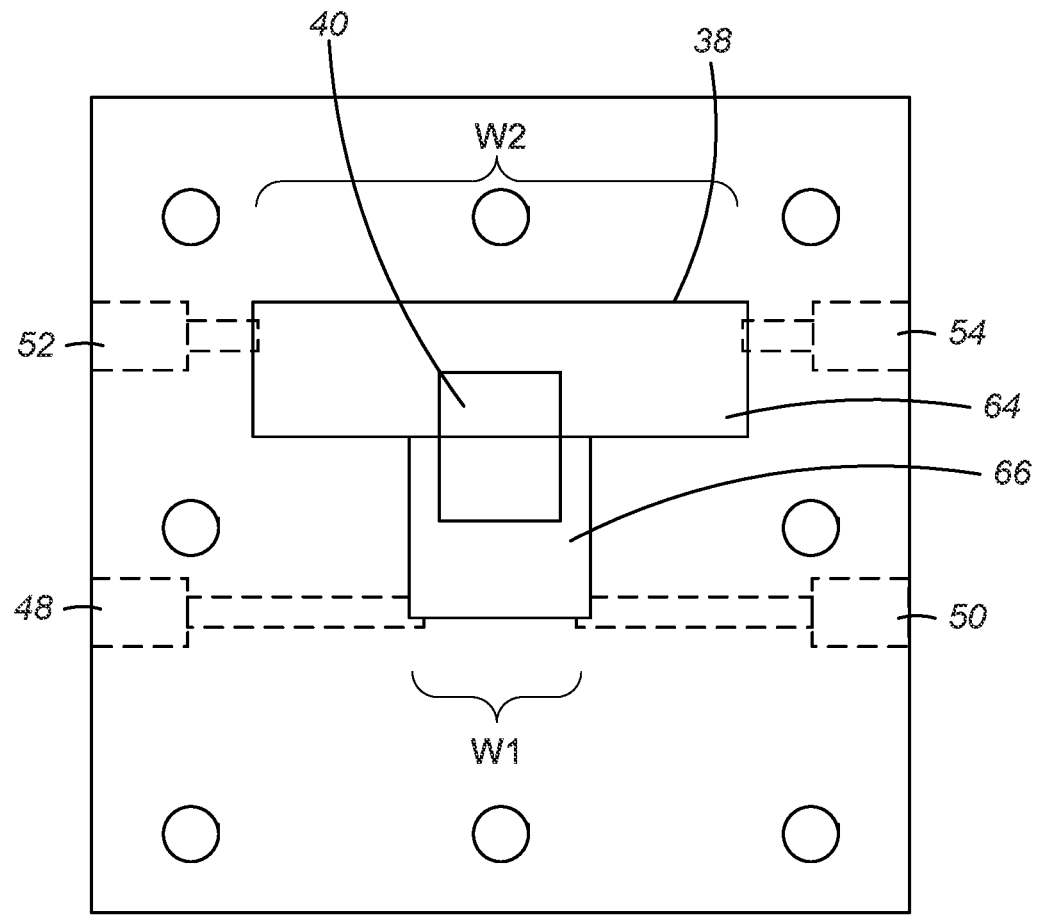
FIG. 3 is a side view of a chamber of the balancing cell of FIG. 2.

As can be best seen in FIG. 3, the first chamber 38 preferably includes an upper portion 64 and a lower portion 66. The upper portion 64 receives the stream of gas 54 from the inlet 52 and is in open communication with the outlet 56 for the gaseous effluent 58. The lower portion 66 receives the first electrolyte 30 via the inlet 48 for the first electrolyte 30 and provides the first electrolyte 30 to the outlet 50 for the first electrolyte 30. The catalyst coated substrate 40 extends between the upper and lower portions 64, 66 of the first chamber 38.

The placement and positioning of the inlets 48, 52 and outlets 50, 56 in the first chamber 30 may be used to achieve a stable level of negative electrolyte on the surface of the catalyst coated substrate 40 at all times while concurrently supplying a method for the wicking of produced protons (H+) away from the catalyst coated substrate 40. Accordingly, control valves (not shown) be used on the lines bringing the various streams to the first chamber to allow for adjustment to ensure a proper level of liquid within the first chamber 38.

In a preferred configuration, the first chamber 38 comprises a T-shape, with the lower portion 66 having a width W1 (distance along a line extending between the inlets 48, 52 and the outlets 50, 56), and the upper portion 64 having a width W2 greater than the width W1 of the lower portion 66. Preferably, the width W2 of the upper portion 64 is also greater that a width of the catalyst coated substrate 40.

By using the upper and lower portions 64, 66 receiving the stream of gas 54 and the first electrolyte 30, respectively, the first chamber 38 is provided with an interface between a liquid phase (the first electrolyte 30) and a gaseous phase (the gas from the stream of gas 54). It is at this interface that, both hydrogen (from the gas) and the first electrolyte 30 contact the catalyst on the catalyst coated substrate 40 and can be oxidized to protons (H+). Additionally, the same reaction may occur lower, within the liquid, based on dissolved hydrogen present in the first electrolyte 30.

Accordingly, it is preferred that the catalyst coated substrate 40 comprises a high surface area. By "high" surface area, it is meant that the surface area of the substrate is at least 1%, or at least 5%, or at least 10%, or at least 25% greater than the area of the substrate as calculated by adding 2(length×width) and 2(width×depth) and 2(length×depth). For example, the substrate of the catalyst coated substrate 40 may be a porous material, like mesh, in order to provide a catalyst coated substrate 40 with a high surface area. The substrate of the catalyst coated substrate 40 may have undulations, a pattern, or a texture to increase the surface area of the catalyst coated substrate 40.

In addition to having a high surface area, the support of the catalyst coated substrate 40 should be conductive and in electrical communication with the electrode of the second chamber. Contemplated materials include graphite, carbon cloth, felt, paper, titanium mesh, conductive plastic, and iron mesh.

Further, the catalyst deposited on the catalyst coated substrate 40 depends on the chemistry of the redox flow battery cell 12. In the depicted example, where the parasitic reaction results in the production of hydrogen gas, platinum may be a catalyst. Other materials may be used like ruthenium, palladium, iridium, and alloys thereof.

Returning to FIG. 2, two gaskets 68 may be used with the separator 46, one on each side, to seal the separator 46 between the two chambers 38, 42. The chambers 38, 42 may be formed in materials that act as current collectors.

The separator 46 is configured to allow for ions to flow between the two electrolytes. Exemplary materials include microporous or ion-exchange membranes. As should be appreciated, the separator may be a layered material with the materials forming a single interface for the electrochemical balancing cell 14.

In use, when hydrogen is oxidized in the first chamber 38, the produced protons (H+) will remain in the anolyte 30 unlike previous designs of electrochemical balancing cells which have the protons deposited into the catholyte or in another fluid. Further, unlike previous designs which require multiple interfaces and thus multiple membranes, the depicted electrochemical balancing cell 14 only requires a single interface between the two chambers 38, 42.

Figure 4:
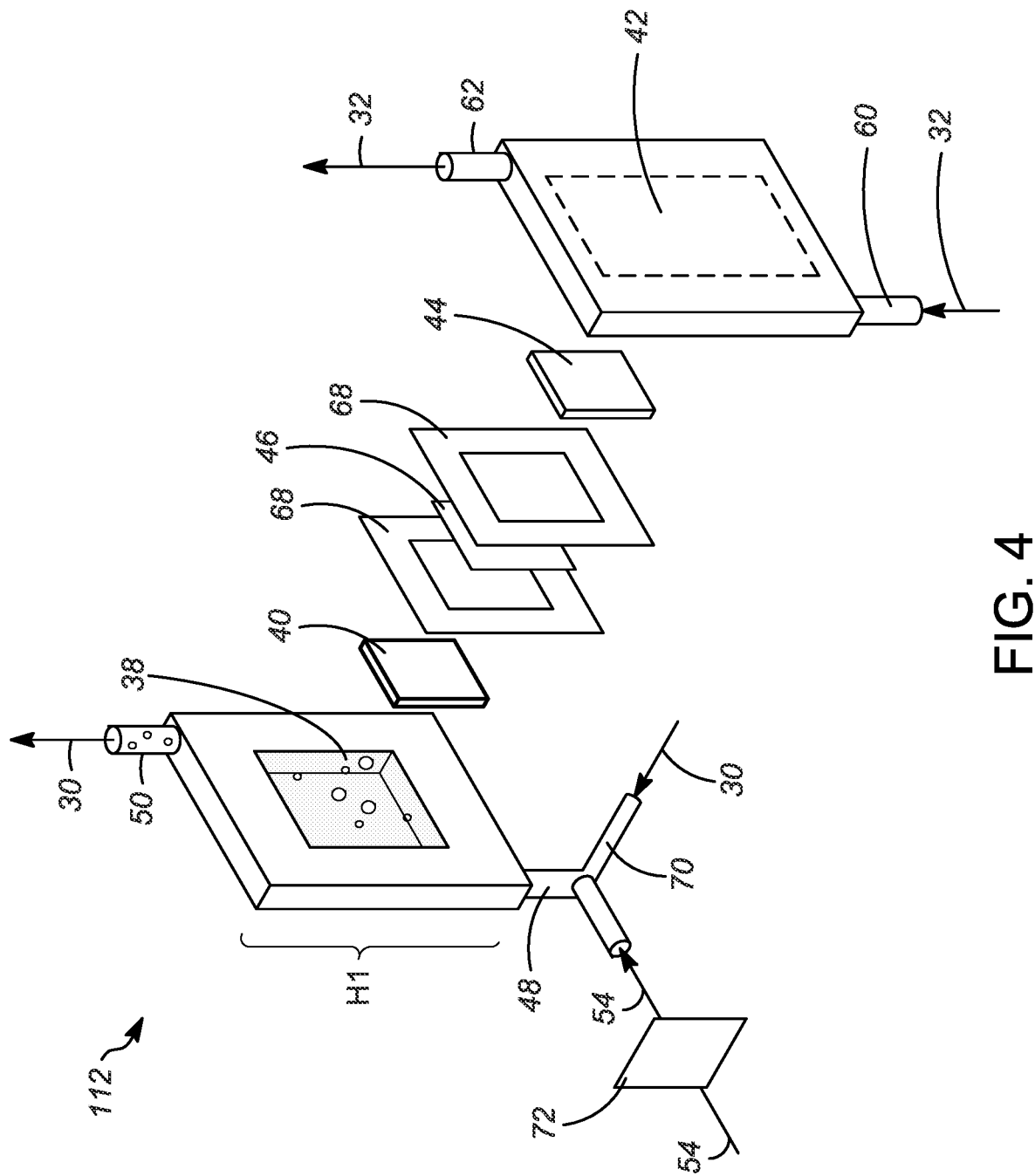
FIG. 4 is a schematic, exploded view of another embodiment of the balancing cell according to the present invention.

Turning to FIG. 4, another embodiment for an electrochemical balancing cell 112 according to the present invention is shown. The same elements in the electrochemical balancing cell 112 of FIG. 4 and the electrochemical balancing cell 14 in FIGS. 2 and 3 are identified by the same reference numerals.

In the electrochemical balancing cell 112 of FIG. 4, the first chamber 38 includes the inlet 48 for the first electrolyte 30. However, instead of the separate inlet 52 for the stream of gas 54 in the previous embodiment, in this embodiment, the stream of gas 54 is introduced to the first chamber 38 of the electrochemical balancing cell 14 with the first electrolyte 30 via the inlet 48 for the first electrolyte 30.

Accordingly, lines, pipes, or conduits carrying the first electrolyte 30 and the stream of gas 54 converge at a junction 70 prior to the first electrolyte 30 being passed into the first chamber 38. A control valve 72 may be disposed in the line carrying the stream of gas 54. The control valve 72 is configured to adjust an amount of the stream of gas 54 that is passed to the first chamber 38 of the electrochemical balancing cell 14.

In FIG. 4 the first electrolyte 30 flows vertically (bottom to top), while in FIGS. 2 and 3, the first electrolyte 30 flows horizontally (left to right). Accordingly, in the embodiment of FIG. 4, the inlet 48 for the first electrolyte 30 is located lower along a height H1 of the first chamber 38 than the outlet 50 for the first electrolyte 30.

The electrochemical balancing cell 112 depicted in FIG. 4 provides the same benefits of as the one depicted in FIGS. 2 and 3. Specifically, the electrochemical balancing cell 112 results in the oxidized products remaining the first electrolyte 30. Additionally, the electrochemical balancing cell 112 only has a single interface and thus does not require membranes for multiple interfaces.

The electrochemical balancing cell 112 of FIG. 4 also provides a configuration that may be operated to extend the life of the catalyst. More specifically, the electrochemical balancing cell 112 may be operated with a continuous voltage applied to the electrode and the catalyst coated substrate 40. The valve 72 can be opened and closed to start and stop the flow of the stream of gas 54 to adjust the current. When the valve 72 is closed, no gas will be oxidized, but the voltage will reduce or prevent the catalyst from degrading over time.

Accordingly, such a configuration allows for new processes for reversing the parasitic reaction in a redox flow battery. As in conventional processes, the present processes include monitoring at least one condition of an electrolyte 30, 32, of the redox flow battery 10. For example, the condition may be a pH, a state of charge, a conductivity, or a pressure in the head spaces of one of the tanks 34, 36 (see, FIG. 1) associated with one of the electrolytes 30, 32. Conventional sensors may be utilized and may be in communication with a controller or a computing devices.

When the measured value of the condition is above or below a preset limit, a flow of the gaseous steam 54 to an electrochemical balancing cell of the redox flow battery may be adjusted via the valve 72 without necessarily require a change to the flow of the first electrolyte 30. Thus, unlike conventional processes, this allows for the flow of the gaseous steam 54 to be adjusted independent of the flow of the electrolyte 30 passed to the electrochemical balancing cell 112. Additionally, unlike conventional processes a constant voltage be maintained between the electrode 44 and the catalyst coated substrate 40—even when the gaseous stream 54 is not flowing to the first chamber 38. This constant voltage will help prevent the catalyst from degrading overtime.

EXAMPLE

A working example of the present invention was produced for a 5-25 cm$^2$ cell. An upper portion of the first chamber was constructed by milling a small active area for the catalyst coated substrate in a graphite current collector. A lower portion of the chamber, in fluid connection with the first, was then drilled into the same current collector. The lower portion of the first chamber was connected to a source of negative electrolyte, and the upper portion of the first chamber was connected to a source of hydrogen. This formed the negative side of the half cell. A positive side was constructed as a normal IFB plate. The same separator was used for the electrochemical rebalancing cell as was used for the redox flow battery cell. All three working fluids (catholyte, anolyte, and hydrogen) were driven by peristaltic pumps to prevent stalling from mass transfer limitations. The catalyst used was a platinum on carbon coated carbon paper. The anolyte contained $Fe^{2+}$ and a supporting electrolyte, and the catholyte contained $Fe^{3+}$ and a supporting electrolyte. The current was monitored via an external system, but the reaction was self-driven.

Figure 5:
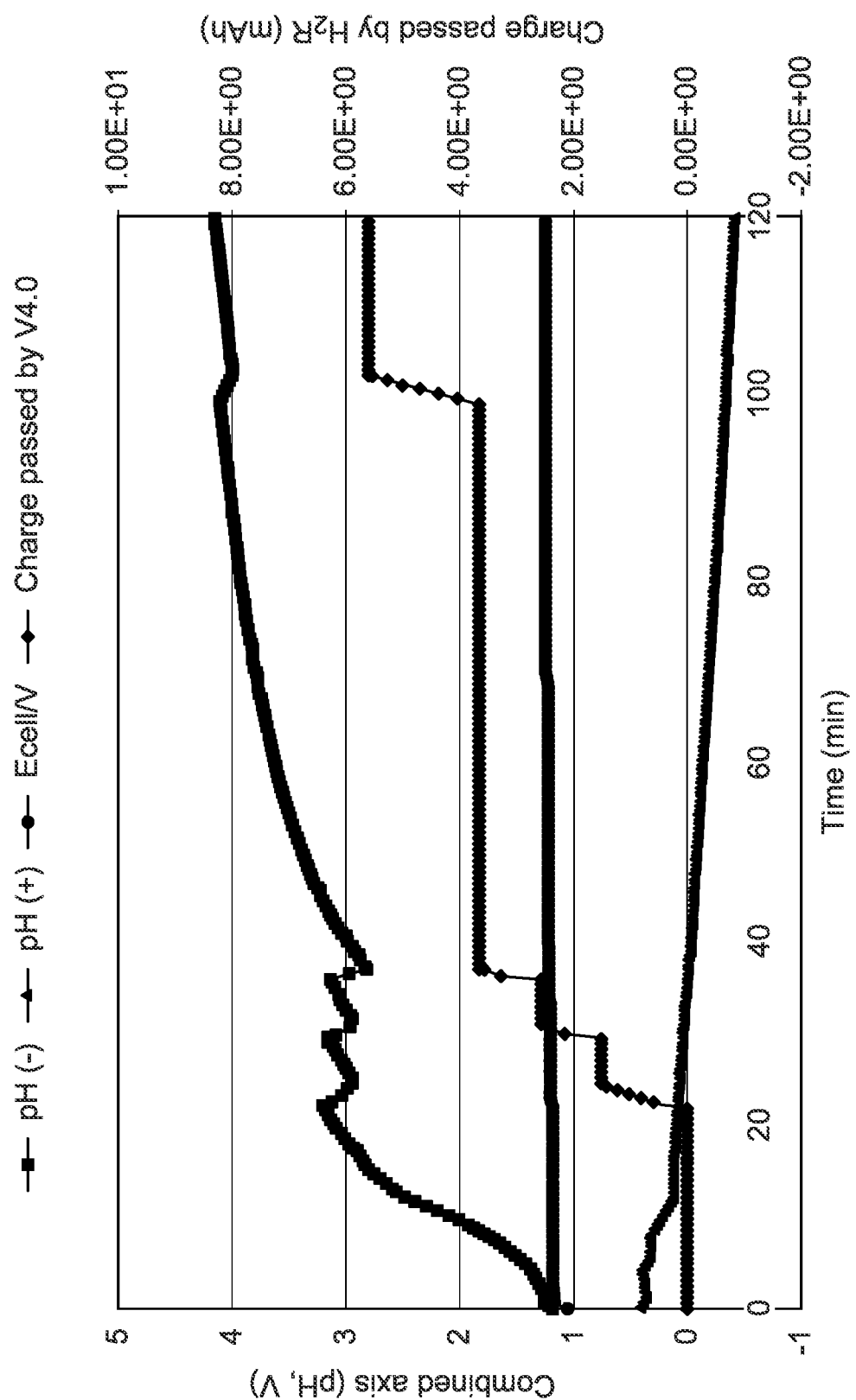
FIG. 5 is a graph showing experimental data based on a balancing cell according to the present invention.

The performance of the working example is shown in FIG. 5. As can be appreciated from FIG. 5, the negative pH of the working example was lowered when the device turned on (as signified by an increase in the line representing charge passed). This was capable of affecting pH control at different pH conditions, both at around 3.0 and also around 4.0 in the negative electrolyte.

Accordingly, the present invention provides rebalancing cells for redox flow batteries that provide advantages over the current configurations.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a redox flow battery, comprising a redox flow battery cell, and an electrochemical balancing cell comprising a first chamber comprising an inlet for a first electrolyte, an outlet for the first electrolyte, and a catalyst coated substrate; a second chamber comprising an inlet for a second electrolyte, an outlet for the second electrolyte, and an electrode, and, a separator forming an interface between the first chamber and the second chamber, wherein the first chamber is configured to receive a stream of a gas from the redox flow battery cell, and wherein the first electrolyte includes a reaction product from an oxidation or reduction of the gas. An embodiment of the invention is one, any or all of prior embodiments in this paragraph up through the first embodiment in this paragraph, wherein the first chamber of the electrochemical balancing cell further comprises an inlet for the stream of the gas. An embodiment of the invention is one, any or all of prior embodiments in this paragraph up through the first embodiment in this paragraph, wherein the first chamber of the electrochemical balancing cell further comprises an upper portion configured to receive the gas from the inlet for the stream of the gas; and, a lower portion configured to receive the first electrolyte from the inlet for the first electrolyte. An embodiment of the invention is one, any or all of prior embodiments in this paragraph up through the first embodiment in this paragraph, wherein the catalyst coated substrate extends between upper portion and the lower portion. An embodiment of the invention is one, any or all of prior embodiments in this paragraph up through the first embodiment in this paragraph, wherein the first chamber further comprises an outlet for a gaseous effluent. An embodiment of the invention is one, any or all of prior embodiments in this paragraph up through the first embodiment in this paragraph, wherein the first chamber comprises a T-shape, with a lower portion and an upper portion that is wider than the lower portion. An embodiment of the invention is one, any or all of prior embodiments in this paragraph up through the first embodiment in this paragraph, wherein the gas from the stream of the gas is introduced to the first chamber of the electrochemical balancing cell with the first electrolyte via the inlet for the first electrolyte. An embodiment of the invention is one, any or all of prior embodiments in this paragraph up through the first embodiment in this paragraph, wherein the inlet for the first electrolyte is located at a height in the first chamber of the electrochemical balancing cell that is lower than a height of the outlet for the first electrolyte. An embodiment of the invention is one, any or all of prior embodiments in this paragraph up through the first embodiment in this paragraph, wherein the catalyst coated substrate comprises a catalyst supported on an electrically conductive porous substrate. An embodiment of the invention is one, any or all of prior embodiments in this paragraph up through the first embodiment in this paragraph, further comprising a control valve in a line in communication with the inlet for the first electrolyte, wherein the control valve is configured to adjust an amount of the gas passed to the first chamber of the electrochemical balancing cell.

A second embodiment of the invention is a redox flow battery comprising an anode half-cell comprising an anode and an anolyte flowing through the anode chamber; a cathode half-cell comprising a cathode and a catholyte flowing through the cathode chamber, the cathode in electrical communication with the anode; and, an electrochemical balancing cell comprising a first chamber comprising an inlet for the anolyte, an outlet for the anolyte, and a catalyst coated substrate. a second chamber comprising an inlet for the catholyte, an outlet for the catholyte, and an electrode; and, a separator forming an interface between the first chamber and the second chamber, wherein the first chamber is configured to receive a gaseous reaction product produced at the anode, and wherein the anolyte includes a reaction product from an oxidation reaction, at the catalyst coated substrate, of the gaseous reaction product. An embodiment of the invention is one, any or all of prior embodiments in this paragraph up through the second embodiment in this paragraph, wherein the first chamber of the electrochemical balancing cell further comprises an inlet for a stream of the gaseous reaction product and an outlet for a gaseous effluent. An embodiment of the invention is one, any or all of prior embodiments in this paragraph up through the second embodiment in this paragraph, wherein the first chamber comprises an upper portion configured to receive the stream of the gaseous reaction product from the inlet for the stream of the gaseous reaction product; and, a lower portion configured to receive the anolyte from the inlet for the anolyte. An embodiment of the invention is one, any or all of prior embodiments in this paragraph up through the second embodiment in this paragraph, wherein the catalyst coated substrate extends between the upper portion and the lower portion. An embodiment of the invention is one, any or all of prior embodiments in this paragraph up through the second embodiment in this paragraph, wherein the first chamber comprises a T-shape, with a lower portion and an upper portion that is wider than the lower portion. An embodiment of the invention is one, any or all of prior embodiments in this paragraph up through the second embodiment in this paragraph, wherein a stream of the gaseous reaction product is introduced to the first chamber with the anolyte via the inlet for the anolyte. An embodiment of the invention is one, any or all of prior embodiments in this paragraph up through the second embodiment in this paragraph, wherein the inlet for the anolyte is located at a height in the first chamber that is lower than a height of the outlet for the anolyte. An embodiment of the invention is one, any or all of prior embodiments in this paragraph up through the second embodiment in this paragraph, wherein a substrate of the catalyst coated substrate comprises a porous substrate. An embodiment of the invention is one, any or all of prior embodiments in this paragraph up through the second embodiment in this paragraph, further comprising a control valve in a line in communication with the inlet for the anolyte, wherein the control valve is configured to adjust an amount of the gaseous reaction product to the first chamber.

A third embodiment of the invention is a process for reversing a parasitic reaction in a redox flow battery, comprising monitoring at least one condition of an electrolyte of a redox flow battery; adjusting, when the at least one condition is above or below a preset limit, a flow of a gaseous steam to an electrochemical balancing cell of the redox flow battery, the gaseous stream comprising a gaseous reaction product from the redox flow battery; and, oxidizing or reducing the gaseous reaction product in the electrochemical balancing cell, wherein the flow of the gaseous steam is adjusted independent of a flow of an electrolyte passed to the electrochemical balancing cell.

A fourth embodiment of the invention is a process for reversing a parasitic reaction in a redox flow battery, the process comprising monitoring a pH of a negative electrolyte of a redox flow battery; adjusting, when the at least one condition is above or below a preset limit, the pH of the negative electrolyte by adjusting a flow of a hydrogen gas to a chamber of an electrochemical balancing cell, the chamber receiving the negative electrolyte; oxidizing the hydrogen gas in the electrochemical balancing cell; and, maintaining a constant voltage of the electrochemical balancing cell while the flow a hydrogen gas is adjusted.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A redox flow battery, comprising:
    a redox flow battery cell, and
    an electrochemical balancing cell comprising:
        a first chamber comprising an inlet for a first electrolyte, an outlet for the first electrolyte, and a catalyst coated substrate;
        a second chamber comprising an inlet for a second electrolyte, an outlet for the second electrolyte, and an electrode, and,
        a separator forming an interface between the first electrolyte in the first chamber and the second electrolyte in the second chamber, wherein the interface formed by the separator is the only interface between the first electrolyte and the second electrolyte in the electrochemical balancing cell,
    wherein the first chamber comprises an inlet configured to receive a stream of a gas from the redox flow battery cell, and
    wherein the first electrolyte includes a reaction product from an oxidation or reduction of the gas,
    wherein the first chamber comprises a T-shape, with a lower portion and an upper portion that is wider than the lower portion.

2. The redox flow battery of claim 1, wherein the first chamber of the electrochemical balancing cell further comprises:
    an upper portion configured to receive the gas from the inlet for the stream of the gas; and,
    a lower portion configured to receive the first electrolyte from the inlet for the first electrolyte.

3. The redox flow battery of claim 2, wherein the catalyst coated substrate extends between upper portion and the lower portion.

4. The redox flow battery of claim 1, wherein the first chamber further comprises an outlet for a gaseous effluent.

5. The redox flow battery of claim 1, wherein the catalyst coated substrate comprises a catalyst supported on an electrically conductive porous substrate.

6. The redox flow battery of claim 1, further comprising:
    a control valve in a line in communication with the inlet for the first electrolyte,
    wherein the control valve is configured to adjust an amount of the gas passed to the first chamber of the electrochemical balancing cell.

7. A redox flow battery comprising:
    an anode half-cell comprising an anode and an anolyte flowing through an anode chamber;
    a cathode half-cell comprising a cathode and a catholyte flowing through a cathode chamber, the cathode in electrical communication with the anode; and,
    an electrochemical balancing cell comprising:
        a first chamber comprising an inlet for the anolyte, an outlet for the anolyte, and a catalyst coated substrate;
        a second chamber comprising an inlet for the catholyte, an outlet for the catholyte, and an electrode; and,
        a separator forming an interface between the anolyte in the first chamber and the catholyte in the second chamber, wherein the interface formed by the separator is the only interface between the first electrolyte and the second electrolyte in the electrochemical balancing cell,
    wherein the first chamber comprises an inlet configured to receive a gaseous reaction product produced at the anode and an outlet for a gaseous effluent, and
    wherein the anolyte includes a reaction product from an oxidation reaction, at the catalyst coated substrate, of the gaseous reaction product,
    wherein the first chamber comprises a T-shape, with a lower portion and an upper portion that is wider than the lower portion.

8. The redox flow battery of claim 7, wherein the first chamber comprises:
    an upper portion configured to receive the stream of the gaseous reaction product from the inlet for the stream of the gaseous reaction product; and,
    a lower portion configured to receive the anolyte from the inlet for the anolyte.

9. The redox flow battery of claim 8, wherein the catalyst coated substrate extends between the upper portion and the lower portion.

10. The redox flow battery of claim 7, wherein a substrate of the catalyst coated substrate comprises a porous substrate.

11. The redox flow battery of claim 7, further comprising:
    a control valve in a line in communication with the inlet for the anolyte,
    wherein the control valve is configured to adjust an amount of the gaseous reaction product to the first chamber.

12. A redox flow battery comprising:
    an anode half-cell comprising an anode and an anolyte flowing through an anode chamber;
    a cathode half-cell comprising a cathode and a catholyte flowing through a cathode chamber, the cathode in electrical communication with the anode; and,
    an electrochemical balancing cell comprising:
        a first chamber comprising an inlet for the anolyte, an outlet for the anolyte, and a catalyst coated substrate;

a second chamber comprising an inlet for the catholyte, an outlet for the catholyte, and an electrode; and, a separator forming an interface between the anolyte in the first chamber and the catholyte in the second chamber, wherein the interface formed by the separator is the only interface between the first electrolyte and the second electrolyte in the electrochemical balancing cell, wherein the first chamber is configured to receive a gaseous reaction product produced at the anode, wherein the anolyte includes a reaction product from an oxidation reaction, at the catalyst coated substrate, of the gaseous reaction product, wherein a stream of the gaseous reaction product is introduced to the first chamber with the anolyte via the inlet for the anolyte, and wherein the inlet for the anolyte is located at a height in the first chamber that is lower than a height of the outlet for the anolyte, wherein the first chamber comprises a T-shape, with a lower portion and an upper portion that is wider than the lower portion.

\* \* \* \* \*